UNITED STATES PATENT OFFICE.

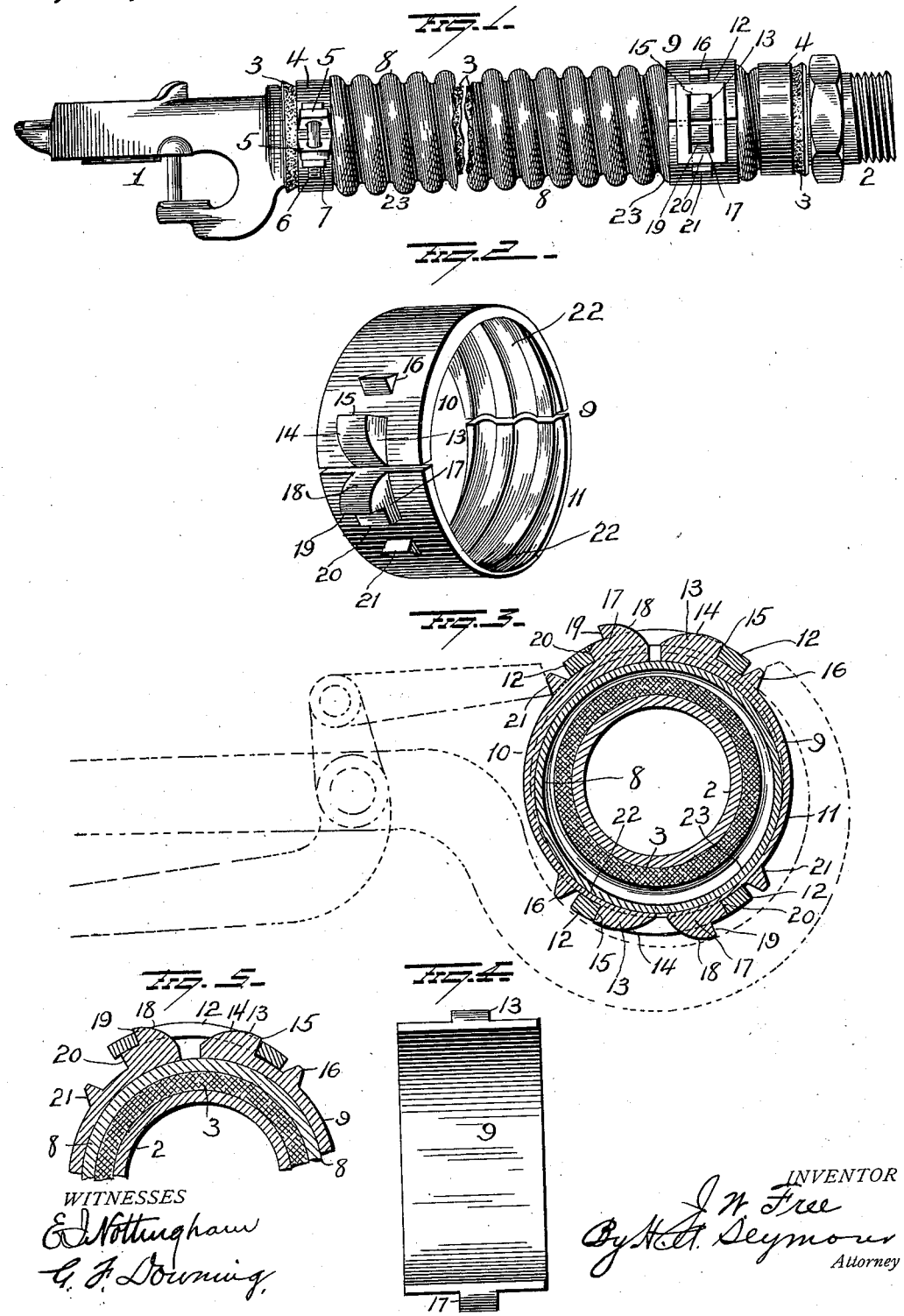

JOHN W. FREE, OF WEST PITTSBURG, PENNSYLVANIA, ASSIGNOR TO SAFETY-ARMORITE CONDUIT COMPANY, OF PITTSBURGH, PENNSYLVANIA.

CLAMPING-BAND FOR ATTACHING HOSE TO COUPLING-NIPPLES.

1,028,937. Specification of Letters Patent. Patented June 11, 1912.

Application filed December 22, 1911. Serial No. 667,308.

*To all whom it may concern:*

Be it known that I, JOHN W. FREE, a citizen of the United States, residing at West Pittsburg, in the county of Lawrence and State of Pennsylvania, have invented certain new and useful Improvements in Clamping-Bands for Attaching Hose to Coupling-Nipples; and I do hereby declare the following to be a full, clear, and exact description of the invention, such as will enable others skilled in the art to which it appertains to make and use the same.

My invention consists in an improvement in clamping bands for attaching hose to coupling nipples, and is especially designed for clamping the end of a flexible steel armor upon a hose connection adapted for use in coupling the steam or air brake pipes of railway cars.

The object of the invention is to provide an adjustable clamp which will be simple and economical in its construction, reliable in use and which may be adjustably secured in place without the aid of bolts or nuts.

With this object in view the invention consists in certain features of construction and combinations of parts as will be hereinafter described and pointed out in the claims.

In the accompanying drawings, Figure 1 is a view in side elevation of an air brake connection provided with the improved clamping band. Fig. 2 is a detached view of clamping band. Fig. 3 is a vertical section of the same. Fig. 4 illustrates a modification, and Fig. 5 is a partial sectional view showing a position which the loop 12 may assume.

1 represents one section of a pipe coupling such as is ordinarily used on air brake and steam pipe connections, and 2 is an ordinary coupling nipple which is adapted to be attached to the steam or air pipes at the end of a railway car. A rubber hose 3 is secured to coupling 1 and coupling nipple 2 by the bands 4 the ends of which are formed with perforated ears 5 for the passage of a bolt 6 by which the two ends of the band are drawn together by means of a nut 7 so as to firmly and securely clamp the ends of the rubber hose in place.

8 is a flexible steel tubular armor which encircles and protects the rubber hose and one or both ends of the flexible armor are secured to the hose by the bands 9. Each band is composed of two semi-circular sections 10 and 11, which are counterparts of each other and the locking loops 12. Sections 10 and 11 of the band are each provided at one end with a locking lug 13 formed with a curved or beveled outer surface 14 and a shoulder 15, and a lug 16, while the opposite end of each section is provided with a locking lug 17 having a curved or beveled outer face 18, and two shoulders 19 and 20, and also a lug 21. The interior surfaces of these bands are formed with spiral grooves 22 which fit the spiral convolutions 23 of the flexible steel tubular armor.

To secure the band in place, its two half sections are applied to one end of the tubular armor, the spiral grooves formed therein fitting the spiral convolutions of the armor, and then one of the curved rectangular loops 12 is slipped over the adjacent locking lugs 13 and 17, the opposite ends of the loop engaging the vertical shoulder 15, on the lug 13, and one of the shoulders 19 or 20 on the locking lug 17. By the application of any suitable clamping tool such for instance as is shown in dotted lines in Fig. 3, the jaws of which engage the lugs 16 and 21, the disconnected ends of the clamp are drawn together to permit one of the loops 12 to be slipped over the locking lugs 13 and 17 and upon the removal of the clamping tool, the expansive force of the end of the tubular armor will be sufficient to retain the locking loops in their locked engagement with the lugs.

By providing the locking lugs with two shoulders 19 and 20 it permits of a considerable range of adjustment of the clamps, which may be increased if desired by providing an additional number of shoulders on the lugs.

My improvement is especially adapted for use in air brake or steam pipe connections for railway cars, as such connections are subjected to the hardest kind of usage and wear, and by providing the flexible hose with flexible steel armor, the connection may be subjected to the hardest kind of usage and wear without injuring it. It is important that the rubber or flexible hose should be secured by clamps independent of those employed in securing the flexible armor in place, as the rubber or flexible tubing yields much more readily to clamping pressure than the end of the flexible armor and hence a clamping action sufficient to be effective in securing the ends of the flexible armor in place would be inadequate to secure the ends of the flexible hose to the coupling nipples. Again the diameters of the flexible armor and flexible hose differ to such an extent that a clamp suitable for the flexible armor would not be adapted for the flexible hose.

The clamps are preferably made of malleable cast iron, and as no bolts or nuts are used for their adjustment their construction is rendered very simple and cheap to manufacture, while the device is safe and reliable in use.

While I have described a clamp adapted for use on flexible steel armor it is evident that it may be employed for clamping rubber or other flexible hose to a coupling nipple and when constructed for such use the band sections will be constructed with smooth interior surfaces as illustrated in Fig. 4.

Having fully described my invention what I claim as new is:—

1. A clamp consisting of a sectional band, the adjacent ends of the sections being provided with locking lugs, one of said lugs being provided with a plurality of shoulders, and loops for adjustably securing the band in place, substantially as set forth.

2. A clamp consisting of a sectional band, the adjacent ends of the sections being provided with locking lugs, one of said lugs being provided with a plurality of shoulders, and also provided with a lug for the engagement of a coupling tool, and loops for adjustably securing the band in place.

3. A clamp consisting of a sectional band, the adjacent ends of the sections being provided with locking lugs, one of said lugs being provided with a plurality of shoulders, the band sections being provided on their inner sides with spiral grooves substantially as set forth.

4. The combination with a flexible steel armor, of a sectional clamping band, each section provided on its inner surface with spirally arranged grooves, the adjacent ends of the sections being provided with locking lugs, the lug on one section having a plurality of shoulders, and loops for adjustably clamping the band sections on the end of the flexible steel armor, substantially as set forth.

In testimony whereof, I have signed this specification in the presence of two subscribing witnesses.

JOHN W. FREE.

Witnesses:
M. M. WATERMAN,
W. L. BROADBENT.

---

Copies of this patent may be obtained for five cents each, by addressing the "Commissioner of Patents, Washington, D. C."